(12) United States Patent
Brady et al.

(10) Patent No.: US 6,817,576 B2
(45) Date of Patent: Nov. 16, 2004

(54) FLIGHT CREW REST ENVIRONMENTAL CONTROL SYSTEM

(75) Inventors: Frank P. Brady, Monroe, WA (US); Andre G. Brasseur, Everett, WA (US)

(73) Assignee: The Boeing Company, Chicago, IL (US)

( * ) Notice: Subject to any disclaimer, the term of this patent is extended or adjusted under 35 U.S.C. 154(b) by 15 days.

(21) Appl. No.: 10/438,137

(22) Filed: May 12, 2003

(65) Prior Publication Data

US 2003/0189132 A1 Oct. 9, 2003

Related U.S. Application Data

(63) Continuation-in-part of application No. 10/215,344, filed on Aug. 8, 2002, now Pat. No. 6,619,589, which is a continuation-in-part of application No. 10/058,819, filed on Jan. 28, 2002, now Pat. No. 6,672,541.

(51) Int. Cl.[7] ............................................... B64D 11/00
(52) U.S. Cl. ..................................................... 244/118.5
(58) Field of Search ........................... 244/118.5, 118.6, 244/125, 128, 129.2, 163

(56) References Cited

U.S. PATENT DOCUMENTS

| 2,092,655 A | 9/1937 | Page, Jr. |
|---|---|---|
| 2,166,542 A | 7/1939 | Bradley |
| 2,869,535 A | 1/1959 | Horrell |
| 2,881,687 A | 4/1959 | Manor |
| 2,937,011 A | 5/1960 | Brahm |
| 3,269,801 A | 8/1966 | Boberg et al. |
| 3,711,044 A | 1/1973 | Matulich |
| 3,825,212 A | 7/1974 | Darges et al. |
| 4,546,939 A | 10/1985 | Cronin |
| 4,706,908 A | 11/1987 | Huffman et al. |
| 4,814,579 A | 3/1989 | Mathis et al. |
| 5,516,330 A | 5/1996 | Dechow et al. |
| 5,791,982 A | 8/1998 | Curry et al. |
| 6,306,032 B1 | 10/2001 | Scheffler et al. |
| 6,375,849 B1 | 4/2002 | Crabtree et al. |
| 6,449,963 B1 | 9/2002 | Ng et al. |
| 6,491,254 B1 | 12/2002 | Walkinshaw et al. |
| 6,544,114 B2 * | 4/2003 | Buchholz ..................... 454/74 |
| 6,619,589 B2 * | 9/2003 | Brasseur et al. ......... 244/118.5 |
| 2003/0141412 A1 * | 7/2003 | Fieldson et al. ......... 244/118.5 |

FOREIGN PATENT DOCUMENTS

GB         2166542 A      5/1986

\* cited by examiner

Primary Examiner—Charles T. Jordan
Assistant Examiner—Stephen A Holzen

(57) ABSTRACT

The present invention provides an environmental control system for an aircraft attendant or crew rest ventilation system. The system provides primary and secondary sources of air to the crew or attendant rest. A pressure sensor within the supply duct determines whether air from the primary duct is within desired pressure limits and controls operation of the ducts accordingly. Additional features related to temperature control and ventilation are also provided.

14 Claims, 4 Drawing Sheets

FLIGHT CREW REST ENVIRONMENTAL CONTROL SYSTEM

PRIORITY CLAIM

This application is a continuation-in-part of prior application Ser. No. 10/215,344, filed Aug. 8, 2002, now U.S. Pat. No. 6,619,589, which is a continuation-in-part of application Ser. No. 10/058,819, filed Jan. 28, 2002, now U.S. Pat. No. 6,672,541, both of which are hereby incorporated by reference.

FIELD OF THE INVENTION

This invention relates generally to aircraft ventilation systems and, more specifically, ventilation systems for air crew and flight attendant rest areas.

BACKGROUND OF THE INVENTION

Many commercial airline flights travel a great enough distance and for a long enough duration that crew rest is required. Because of the need for adequate rest facilities for the flight crew and cabin crew members, rest areas are sometimes provided within the aircraft for use by the crew members while the aircraft is in flight or on the ground. In many cases, the rest areas are relatively small, such as single person units remotely located in the vicinity of the aircraft's cockpit. In other aircraft, flight crew rest areas are created in an overhead crown area, above the passenger seating area.

Ventilation systems in the rest areas are typically tied directly into the aircraft's main ventilation system. Obtaining and maintaining a habitable environment within the rest areas and complying with safety regulations has been a problem due to a number of factors, including a relatively large size of the main ventilation system of the aircraft, wide ranging atmospheric environmental conditions, the relatively small size of the rest areas, and the location of the rest areas in remote parts within the aircraft.

Cool air pulled from the aircraft's main air conditioning pack is often excessively cold for relatively small rest areas. If the aircraft's main ventilation system is continually running, the rest area is too cold to occupy until the rest area can be adequately heated. Conversely, if the ventilation system is shut down for any appreciable length of time, especially in warmer climates, the rest areas can become too hot to occupy. In either case, the rest areas and the items within the rest area represent a thermal mass that increases the time required to heat or cool the space to a habitable level. This additional uninhabitable period reduces the amount of time a crew member can rest, potentially preventing some crew members from receiving enough rest.

Another problem with pulling air directly from the main air conditioning pack is the adverse effect on ventilation system components. More specifically, under certain atmospheric conditions, such as those encountered on the ground or in flight below 25,000 feet, icing can occur in the ventilation system. Icing is particularly likely under warn, humid conditions in which moist air drawn from outside the aircraft is cooled and freezes within the ductwork. Icing can detrimentally affect operation of shut-off valves and other components downstream from the air conditioning packs, creating an undesirable or uncertifiable ventilation condition. Frozen valves are particularly troublesome when the valves operate a system to exhaust smoke from the cabin.

Therefore, there is a need for a system for maintaining habitable conditions in aircraft crew rest areas during all phases of flight, including ground operations and taxi, takeoff, and landing.

SUMMARY OF THE INVENTION

The preferred form of the present invention incorporates a pressure sensor in line with the main overhead flight crew rest air supply line. The pressure sensor provides information to the environmental control system regarding the amount of air flowing through the main supply line. If air pressure decreases because of ice build-up, a failed supply valve, a ruptured supply duct, or any other reason, it will be detected by the pressure sensor. In the event the pressure drops below a desired level, the environmental control system opens a valve on a secondary air supply line.

In accordance with other preferred aspects of the invention, the air temperature from the air packs is maintained below 40 degrees F. so that only heaters are required downstream to obtain the desired air temperature. Air conditioning is not required, thereby reducing the likelihood of icing and simplifying the overall configuration.

The invention also preferably includes provisions for smoke detection and exhaust, fault detection and maintenance, and other features.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
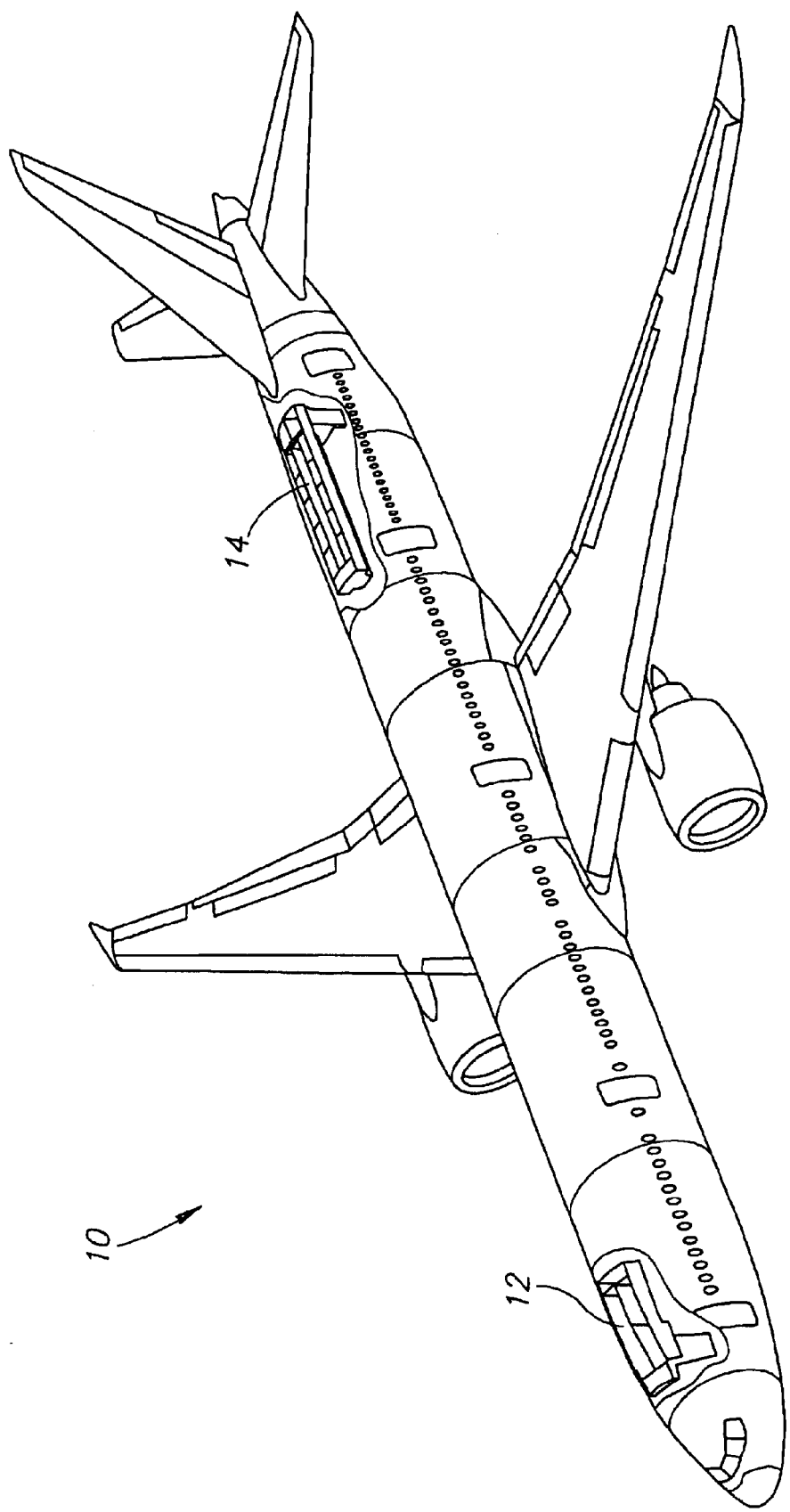
FIG. 1 is a perspective view of a representative aircraft having an overhead flight crew rest and an overhead flight attendant rest.

FIG. 1 illustrates a representative aircraft having overhead attendant and crew rests. In the example illustrated in FIG. 1, a Boeing 777-300ER is shown. The present crew and attendant rest environmental control system, however, may be used in any other aircraft. The aircraft 10 as illustrated includes both an overhead flight crew rest 12 and an overhead flight attendant rest 14. As shown, both the crew rest 12 and flight attendant rest 14 are positioned overhead, that is, in the crown of the aircraft and above the main passenger cabin. The crew rest 12 and attendant rest 14 may alternatively be located in any other position within the aircraft, and need not be in an overhead configuration. Likewise, while this description will often refer to separate crew rests and attendant rests because they are both separately included in a preferred embodiment, the concepts of the invention are interchangeable. Consequently, the present system may be employed in an aircraft having one or more rest areas located in any portion of the aircraft, regardless of whether any such rest area is designated for crew, flight attendants, or passengers.

Figure 2A:
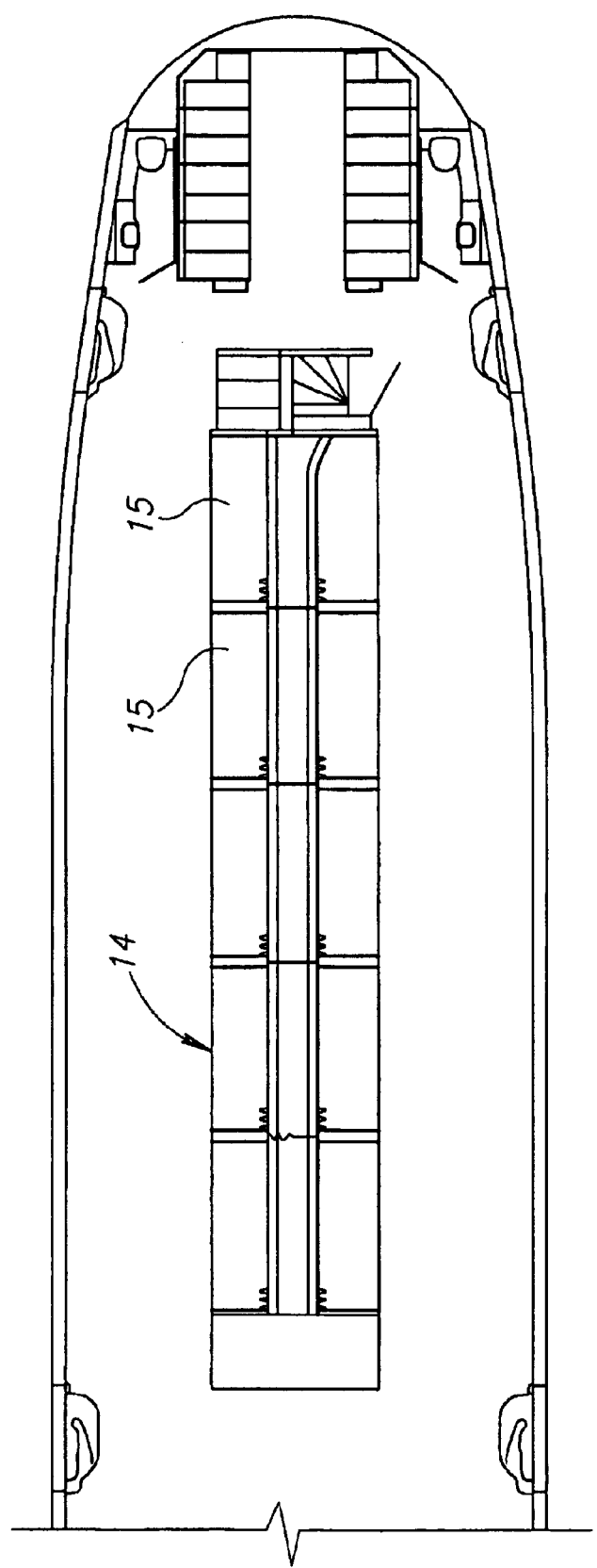
FIG. 2A is a plan view of a representative overhead attendant or crew rest.
Figure 2B:
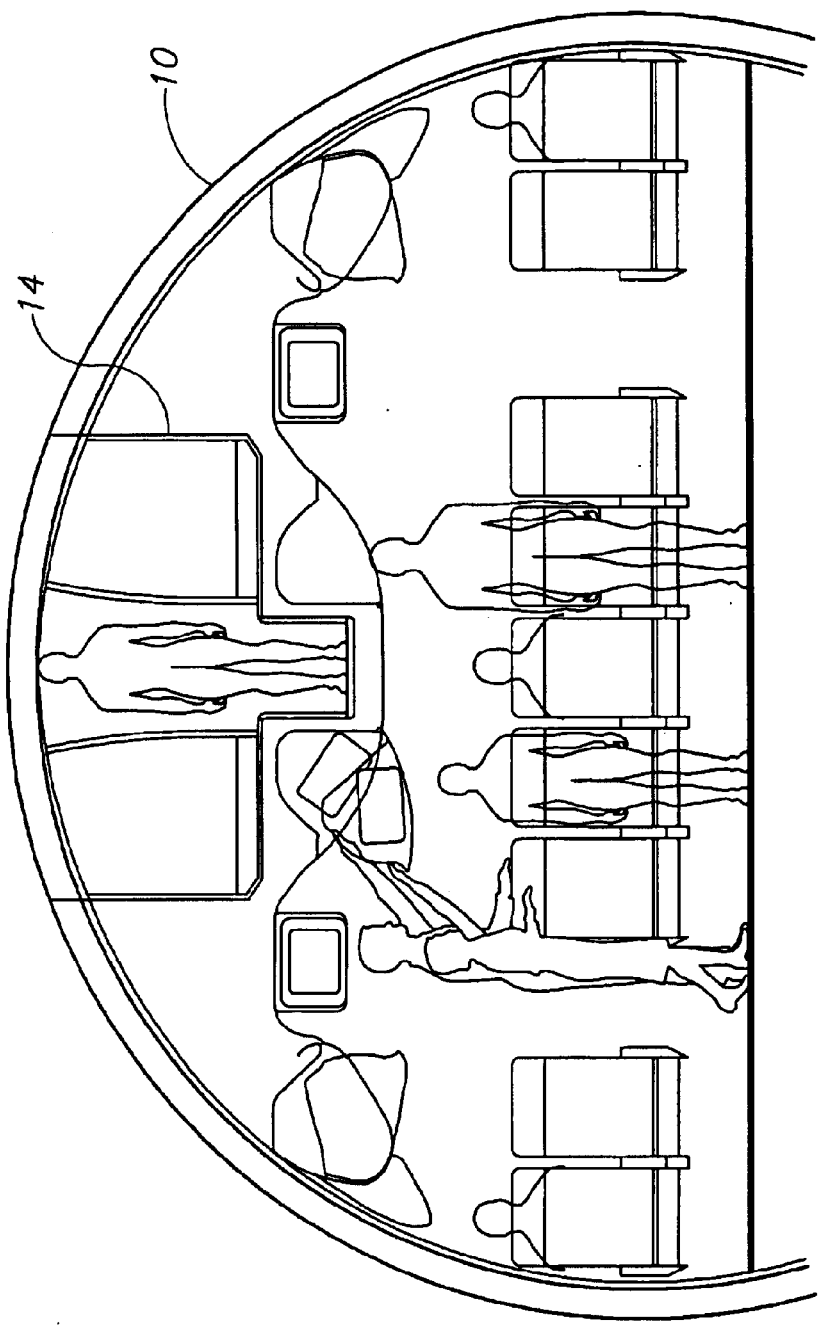
FIG. 2B is a front view of a representative overhead attendant or crew rest; and, FIG. 3 is a schematic diagram of an aircraft attendant rest air distribution system.

FIGS. 2A and 2B further illustrate various aspects of a preferred crew or attendant rest. As shown in FIG. 2A, an overhead rest area 14 can include any number of bunks 15 or other berths, changing areas, and other features. FIG. 2B illustrates the manner in which an overhead rest, in this case representatively an attendant rest 14, can be incorporated into the crown of an aircraft 10.

Figure 3:
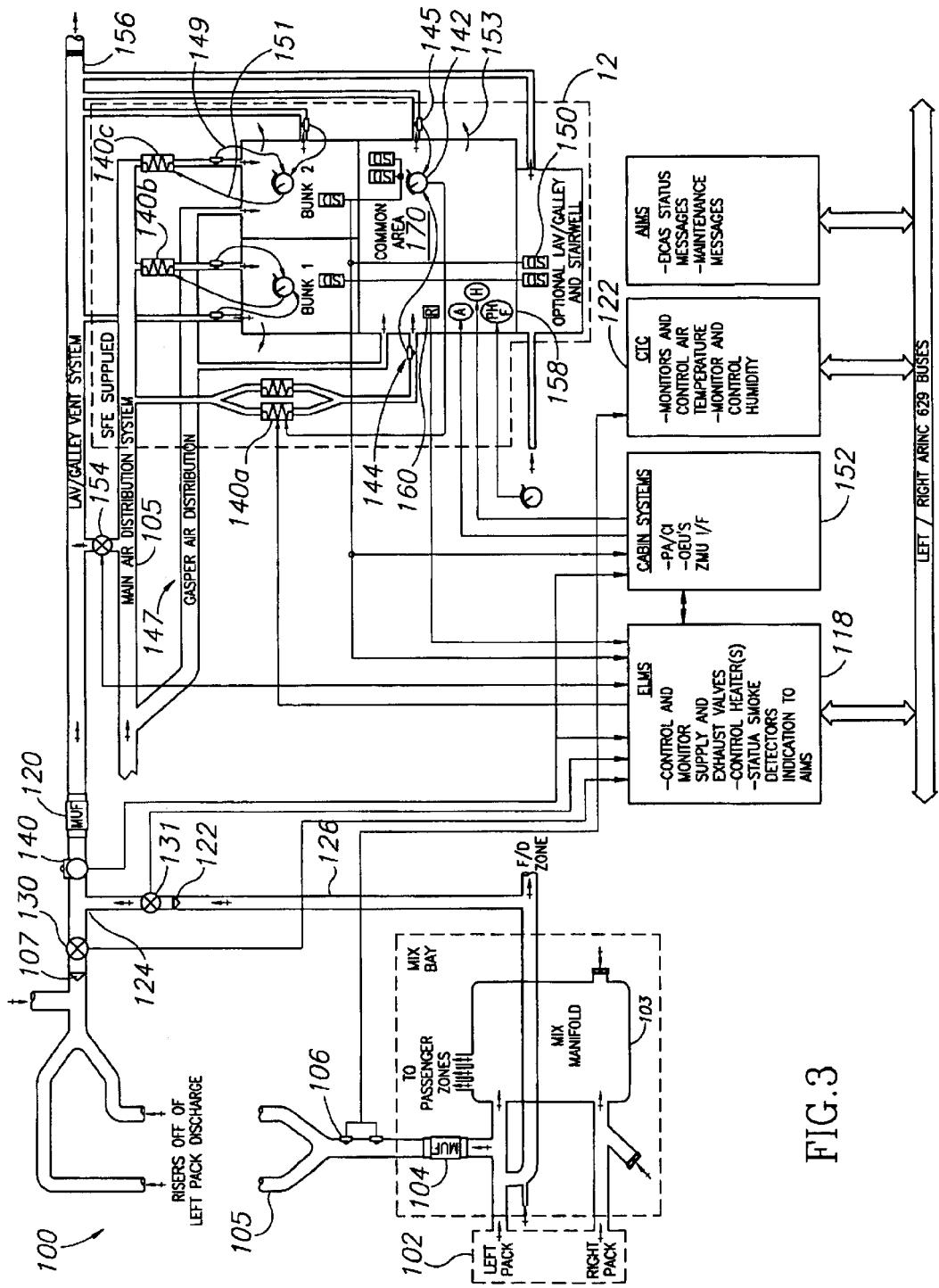

FIG. 3 is a schematic diagram of a preferred aircraft attendant rest air distribution system 100. Air from outside the aircraft is drawn into the aircraft by an air pack 102, which serves as a source of air. The pack 102 performs a variety of functions, such as compressing the relatively thin air drawn from outside the aircraft, heating or cooling the air, and pumping it through the ductwork. Preferably, there are multiple packs 102, including a left and right pack located on opposite sides of the aircraft.

The air distribution system also includes a mix manifold 103 to mix fresh air with air recirculated from the cabin. Air ultimately delivered to the attendant or crew rests can comprise either fresh air or air mixed with recirculated air. In a preferred embodiment, the crew or attendant rests are fed only fresh air delivered from only one of the two air packs 102. As an alternative, the rest areas are fed air that blends recirculated air with outside air.

After the air is drawn in by the pack 102, it travels through a central duct 105 having a low frequency muffler 104 containing baffles or other noise abating structures. The air continues through ductwork in the direction of arrows provided in FIG. 3. A pair of temperature sensors 106 is included and configured to detect the temperature of the air flowing through the duct 105. Only a single temperature sensor need be used, but multiple sensors are preferred for reliability and redundancy. The sensors 106 are in communication with the cabin temperature controller, or CTC 122, which monitors the air traveling through the ductwork and maintains the air temperature at a maximum of 40 degrees F. when a crew or attendant rest is installed and the main crew rest supply valve 130 is opened and supplying air to the crew or attendant rest.

Continuing in the direction of airflow, the duct 105 includes an in-line screen 107 for preventing ice and the like from passing further downstream. After the ice screen, the main crew rest supply valve 130 controls the flow of air into the crew rest. The main supply valve 130 is in electrical communication with the Electrical Load Management System, or ELMS 118, which monitors and provides power to various aircraft subsystems, including the valves, heaters, and other components.

Downstream from the main control valve 130, the duct forms a tee 124. Although designated and illustrated as a perpendicular tee, a wye or other configuration is also possible. Primarily, the tee 124 joins a secondary supply duct 126 to the primary supply duct 105 downstream from the main supply valve 130. Traveling upstream along the base of the tee 124, a secondary supply valve 131 controls the flow of air through the secondary supply duct 126 and into the main supply duct 105. Further upstream from the secondary supply valve is an in-line ice filter 122 to prevent ice or other debris from traveling downstream past the filter.

The secondary supply duct 126 can draw air from any source, including for example either of the air packs 102. In some embodiments, it may be desirable to draw the air in the secondary supply duct from a source other than that being used for the main duct 105 to provide additional redundancy against possible supply problems.

Just beyond the tee 124, a pressure sensor 140 is provided in the main duct 105. The pressure sensor detects the pressure of air traveling through the main duct, and provides an electrical signal indicative of the air pressure to the ELMS 118. The sensor is also in signal communication with a cabin systems monitor 152, which monitors various sensors and is in communication with ELMS 118. In the event the pressure detected by the sensor 140 drops below a desired level (which can be preset or adjusted), the ELMS (in coordination with cabin systems monitor 152) causes the secondary supply valve 131 to open. The secondary supply valve will be opened by ELMS a sufficient amount necessary to increase the overall air pressure to the desired level. In an alternate embodiment, the primary and secondary valves are only able to fully open or fully close, so that one of the valves is fully open while the other is fully closed.

An additional safety measure is provided in the event the flow of air, as determined by the pressure sensor or other monitoring device, is too low and cannot be raised to acceptable levels by opening the secondary valve. In such an event, ELMS will cause the exhaust valve 154 to open, drawing air from the rest area into the lavatory/galley ventilation system 156. In addition, an alarm will sound to notify those in the rest area of the condition. The preferred alarm is three audible chimes. Upon hearing the alarm, a crew member will open the rest area door to allow cabin and crown air to be drawn through the door and into the rest area as a result of the draft produced by the open exhaust valve.

An additional high frequency muffler 120 containing baffles or other noise abating structures is provided downstream from the pressure sensor 140. Though only a few are shown, any number of mufflers or other noise abatement devices may be placed as desired throughout the system.

The air traveling through the main supply duct 105 ultimately travels to the crew rest 12 (or attendant rest 14), which includes separate heaters and temperature controllers associated with individual bunks within the crew rest 12. Thus, air travels through the main crew rest duct 105, forming branches to feed each separate bunk or common area. As illustrated, the crew rest includes a common area 170, first bunk 171, and second bunk 172. The air supply duct forms a separate branch feeding each of the common area 170 and first and second bunks 170, 172, with a heater 140a,b,c and temperature sensor 144 in each branch. The heaters 140a within the common area supply duct 105a are provided in parallel for improved reliability.

The in-line temperature sensors 144 and one or more ambient air sensors 145 are in communication with a closed loop temperature controller 142, which a crew member may operate to control the temperature of the air entering the rest are 14. In the preferred form, the ambient air sensors 145 are placed within a return air path to improve response times, though they may alternatively be placed in other locations. Several separate temperature controllers may be used, such as a separate one in control of each of the bunk and common areas. The temperature controller 142 indicates the temperature of the air in the appropriate portion of the rest area, as measured by the sensors 144 and 145. The temperature controller 142 is also coupled to the attendant rest heater 140 to cause the heater to increase or decrease the temperature of the air. Similarly, the temperature controllers within the bunk areas are coupled to the bunk heaters 140b, c to cause the heaters to increase the temperature of the air, as appropriate.

In the preferred embodiment, the ambient air sensor 145 is located in a duct joining the rest area to the lavatory/galley vent system 156, so that the sensor 145 is monitoring air that ultimately exits the aircraft. Alternatively, the return air sensor may be located in other areas, such as in a duct in the return air path. Regardless of its precise location, the return air sensor 145 is configured to sense the temperature of moving air leaving the rest area, rather than static air within the rest area. In doing so, the controller 142 provides a faster response rate and more precise temperature control.

Ultimately, the air flowing through the main duct 105 travels through one or more rest area ducts 105a, 105b, 105c and enters the attendant rest through one or more outlets 149 within the attendant rest 12 or crew rest 14.

A separate flow of air is provided in individual air outlets 151, sometimes called "gasper" air. An air distribution duct 147 branches from the main supply duct 105 just beyond the valve 130. Accordingly, the air traveling through the duct 147 bypasses the trim heating system within the crew rest and will generally be a source of cool air. The duct ultimately enters the rest area via nozzles, diffusers, or other outlets 151 that are individually controllable to provide cool air and a measure of individual, localized temperature control.

A return air grill 153 is included within the rest area to draw air from the rest area and into a return air path. Though the air may be exhausted or returned in a variety of ways, in the preferred embodiment it is vented to the crown of the aircraft where it is drawn back to the upper recirculating fans.

One added feature of the present air distribution system is that it does not include a separate complete duct system to exhaust air from the attendant or crew rest in the event of fire. Instead, the lavatory and galley vent system is used to exhaust the air from the existing air distribution supply duct work using some of the same ducting that supplies air during normal operations. The crew rest 12, 14 includes one or more smoke detectors 150 in communication with a cabin systems monitor 152. In the event smoke is sensed by a smoke detector 150, the cabin systems monitor 152 triggers audible and visual alarms 158 such as horns and lights indicating the presence of fire and further that the air flow has been stopped. The cabin systems monitor also sends a signal to ELMS 118, which closes the air distribution valve 130 and secondary valve 131 (if open) to stop the flow of air into the crew rest 12, 14. ELMS 118 also opens an exhaust valve 154 joining the supply duct 105 (downstream of the distribution valve 130) to the lavatory/galley ventilation system 156 and shuts off the heaters 140. By opening and closing the appropriate valves, the air flowing into the attendant rest is stopped and the exhaust system is operated to draw the smoke-filled air out of the rest area 12, 14. Thus, the same ducts that previously supplied air to the rest area are now drawing air from it. Once the emergency has cleared, an attendant or crew member can return the air flow to normal by triggering a reset switch 160. The reset switch 160 is in communication with the cabin systems monitor 152, which receives a signal from the switch and instructs ELMS 118 to open and close valves and resume heating, as appropriate.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An environmental control system for a rest area in an aircraft, comprising: a first air source configured to supply a first volume of air; a first air duct arranged to receive the first volume of air from the first air source and deliver it to the rest area; a sensor configured to determine the amount of the air traveling through the first air duct; a second air duct connected to the first air duct and configured to deliver a second volume of air to the rest area via the first air duct; a valve within the second air duct; and a system controller in communication with the sensor and the valve, whereby when the sensor indicates that the amount of the air traveling through the first duct is below a desired level, the system controller causes the valve to open a sufficient degree to enable at least a portion of the second volume of air to flow to restore air flow above the desired level, wherein the sensor is a pressure sensor, an exhaust ventilation system including an exhaust duct, the exhaust duct being joined to the first air duct; an exhaust shutoff valve configured to control the flow of air from the first duct to the exhaust duct; a supply shutoff valve within the first air duct; and a smoke or fire detector within the rest area and configured to provide a signal to the system controller when the detector detects the presence of smoke or fire in the rest area wherein when the detector detects the presence of smoke or fire the system controller causes the supply shutoff valve to substantially close and the exhaust shutoff valve to open so that air within the rest area is drawn out of the rest area through at least a portion of the first air duct and into the ventilation duct.

2. The control system of claim 1, further comprising a heater configured to heat the air between the supply shutoff valve and the rest area, and a temperature controller within the rest area, the temperature controller being configured to control the operation of the heater.

3. The control system of claim 2, wherein the first air source and the second air source comprise a single source of air.

4. The control system of claim 3, wherein the first air source and the second air source comprise different sources of air.

5. The control system of claim 4, further comprising a return air duct and a first temperature sensor adjacent or within the return air duct, and wherein the temperature controller controls the operation of the heater as a function of the temperature sensed by the first temperature sensor.

6. The control system of claim 1, wherein the air supplied by the first air source and the air supplied by the second air source is less than or equal to 40 degrees F.

7. The control system of claim 1, wherein the first air source and the second air source each comprise fresh air.

8. An environmental control system for a rest area in an aircraft comprising a first air source configured to supply a first volume of air; a first air duct arranged to receive the first volume of air from the first air source and deliver it to the rest area; a means for determining the amount of the air traveling through the first air duct; a second air duct connected to the first air duct and configured to deliver a second volume of air to the rest area via the first air duct; a means for controlling the flow of air within the second air duct; and a system controller in communication with the means for determining and the means for controlling, whereby when the means for determining indicates that the amount of the air traveling through the first duct is below a desired level, the system controller causes the means for controlling to enable at least a portion of the second volume of air to flow to restore air flow above the desired level, wherein the means for determining the amount of air comprises a pressure sensor, an exhaust ventilation system including an exhaust duct, the exhaust duct being joined to the first air duct; an exhaust shutoff valve configured to control the flow of air from the first duct to the exhaust duct; a supply shutoff valve within the first air duct; and a smoke or fire detector within the rest area and configured to provide a signal to the system controller when the detector detects the presence of smoke or fire in the rest area wherein when the detector detects the presence of smoke or fire the system controller causes the supply shutoff valve to substantially close and the exhaust shutoff valve to open so that air within the rest area is drawn out of the rest area through at least a portion of the first air duct and into the ventilation duct.

9. The control system of claim 8, further comprising a heater configured to heat the air between the supply shutoff valve and the rest area, and a temperature controller within the rest area, the temperature controller being configured to control the operation of the heater.

10. The control system of claim 9, wherein the first air source and the second air source comprise a single source of air.

11. The control system of claim 10, wherein the first air source and the second air source comprise different sources of air.

12. The control system of claim 11, further comprising a return air duct and a first temperature sensor adjacent or within the return air duct, and wherein the temperature controller controls the operation of the heater as a function of the temperature sensed by the first temperature sensor.

13. The control system of claim 8, wherein the air supplied by the first air source and the air supplied by the second air source is less than or equal to 40 degrees F.

14. The control system of claim 8, wherein the first air source and the second air source each comprise fresh air.

* * * * *